F. B. COCKBURN AND J. C. CARLTON.
PROJECTILE TURNER.
APPLICATION FILED JUNE 18, 1917.
1,313,166.
Patented Aug. 12, 1919.
2 SHEETS—SHEET 1.
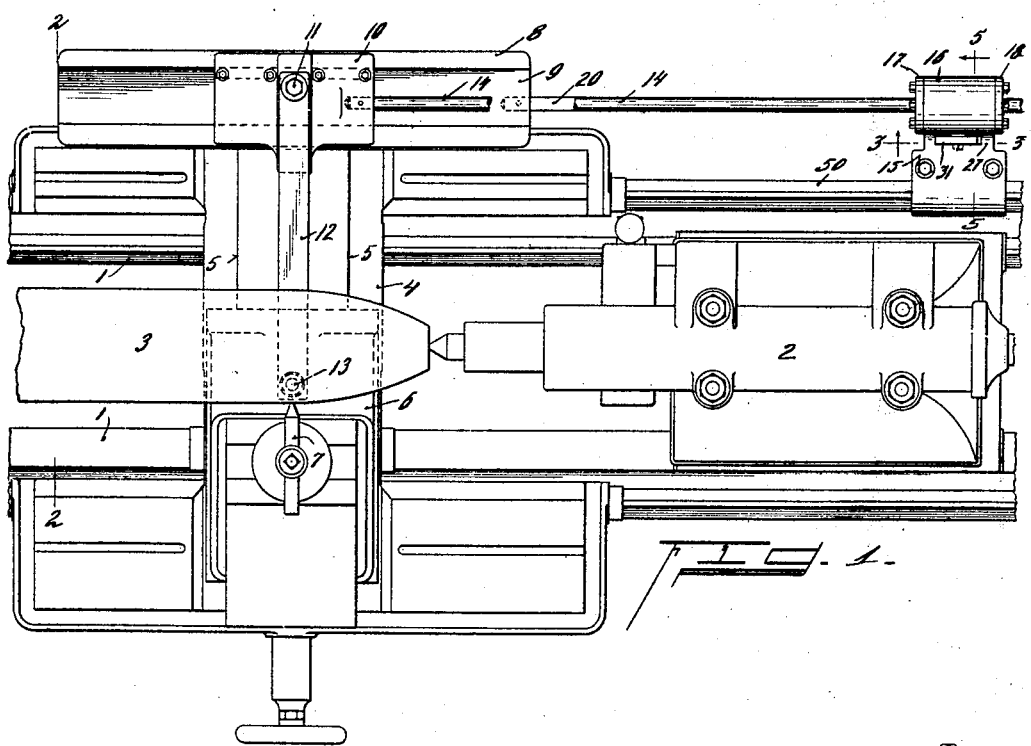
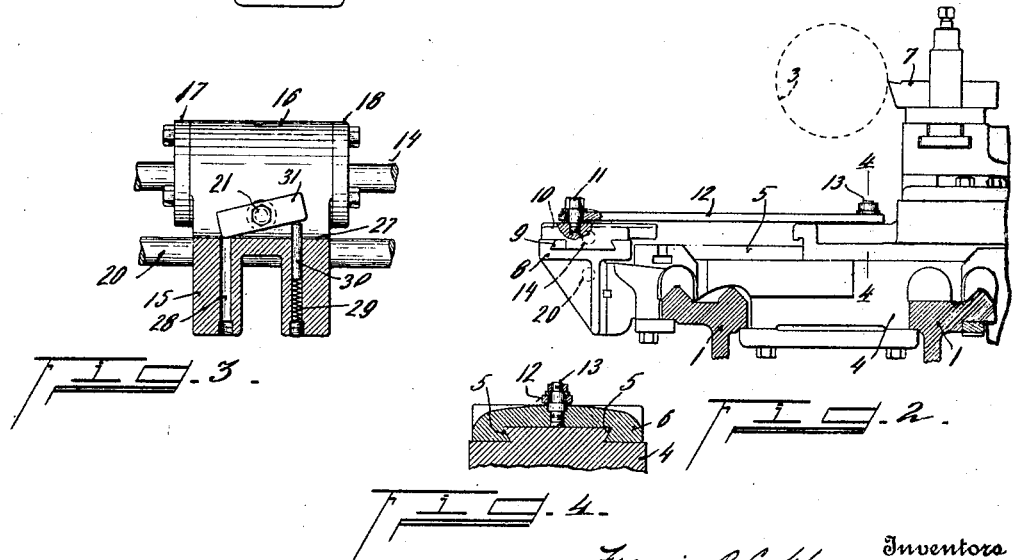
Francis B. Cockburn
Jack C. Carlton
Inventors
By Wood & Wood
Attorneys
Witness

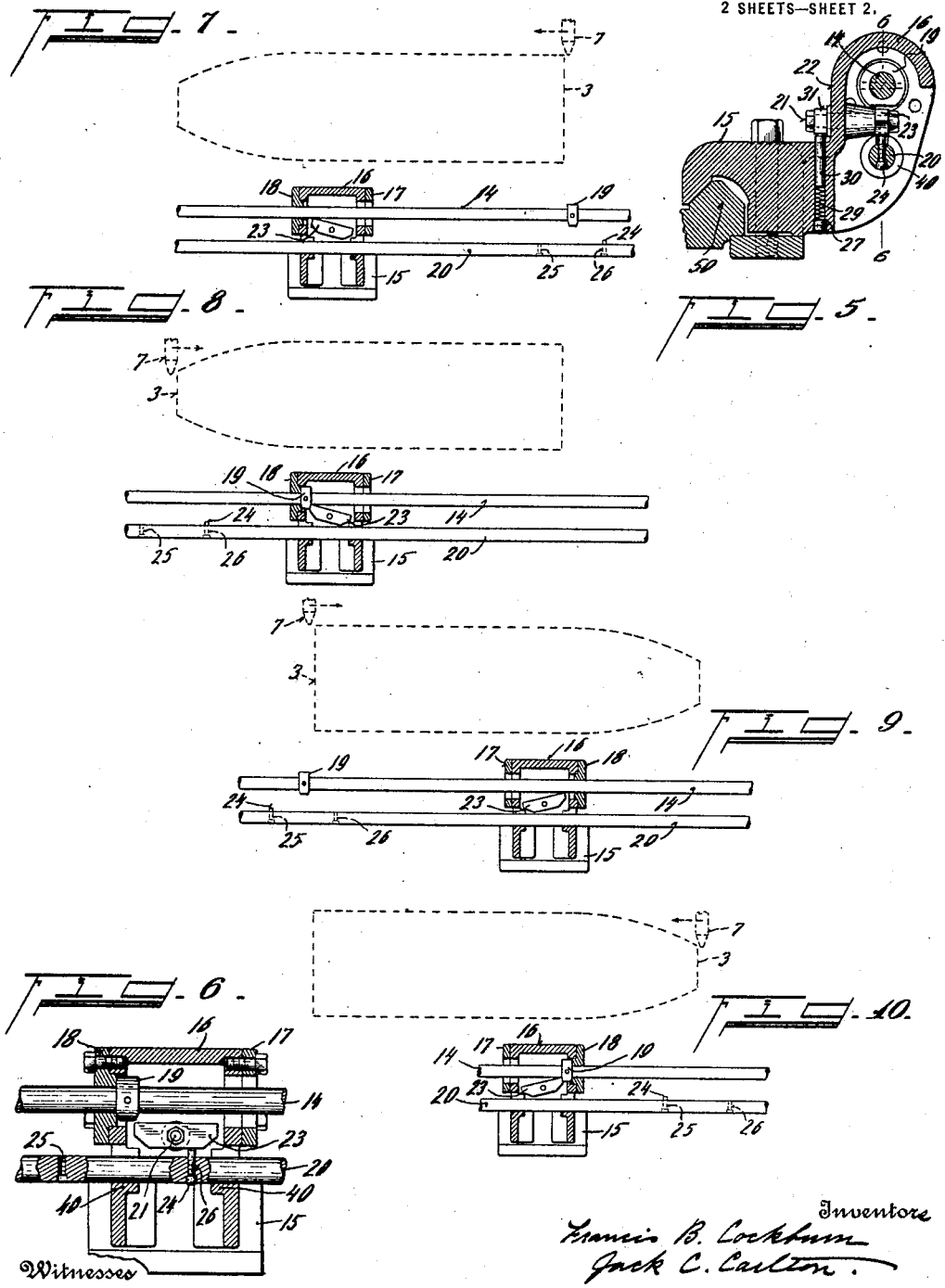

UNITED STATES PATENT OFFICE.

FRANCIS B. COCKBURN AND JACK C. CARLTON, OF CINCINNATI, OHIO, ASSIGNORS TO THE LODGE & SHIPLEY MACHINE TOOL COMPANY, OF CINCINNATI, OHIO, A CORPORATION OF OHIO.

PROJECTILE-TURNER.

1,313,166.  Specification of Letters Patent.  Patented Aug. 12, 1919.

Application filed June 18, 1917. Serial No. 175,297.

*To all whom it may concern:*

Be it known that we, FRANCIS B. COCKBURN, a subject of Great Britain, and JACK C. CARLTON, a citizen of the United States, and residing at Cincinnati, in the county of Hamilton and State of Ohio, have invented a new and useful Improvement in Projectile-Turners, of which the following specification is a full disclosure.

Our invention relates to an improvement in machine tools for cutting straight and curved surfaces, such as projectile-turning. In the main, the invention represents an improvement over United States Patent Numbered 1,171,665, granted February 15, 1916, to W. Schellenbach, for projectile turners, which had the disadvantage of incapacity to make a continuous straight and curved cut.

An object of this invention is, therefore, to provide mechanism enabling a tool to be guided from a straight line to a curved line cut in a continuous movement, or vice versa, and in either direction of carriage travel, there being tripping mechanism arranged to be set for producing the straight and curved cuts in any desired sequence or direction, and the position of setting determining the point at which the tool will automatically change its line of cutting travel in a continuous carriage feed.

The invention will be best understood in relation to a conventional engine lathe, shown in the drawings, which, together with the following description, forms a part of this specification, wherein:—

Figure 1 is a top plan view of a portion of a lathe provided with the mechanism herein described.

Fig. 2 is a section on line 2—2, Fig. 1.

Fig. 3 is an enlarged detail section on line 3—3, Fig. 1.

Fig. 4 is a detail section on line 4—4, Fig. 2.

Fig. 5 is an enlarged detail section on line 5—5, Fig. 1.

Fig. 6 is a section on line 6—6, Fig. 5.

Figs. 7 to 10 are diagrammatic views, taken from the back of the lathe, showing the various positions of the tool-slide control mechanism.

In the drawings, 1 represents the lathe bed, 2 the tail-stock, and 3 the work, specifically shown as a finished projectile, having the usual circumferential and conical or taper portions, which have to be machined with corresponding straight and curved line tool cuts. It is not necessary to show the lathe head-stock. The carriage 4 is moved longitudinally on the rails of the bed by the usual lathe feed mechanism, which is not shown. The carriage has the usual crossways 5 for the tool-slide 6 and its tool 7, the carriage moving the tool longitudinally of the work, and the tool-slide being moved to and from the work as the carriage travels lengthwise of the work for providing the contour or curved surface cutting. On the back rail of the carriage is a guide plate 8 held stationary on the carriage and formed with an upper surface slide or gibway 9, extending parallel with the carriage rails of the bed. To the way 9 a slide pivot-block 10 is gibbed, carrying the upright pivot stud 11. A radius bar 12 has one end swivel connected to stud 11 and the other end is pivotally connected to the stud 13 of the tool-slide 6, the bar passing under the work.

It will be understood that when the block 10 is not held against movement in its slide-way 9, it will travel parallel with the carriage lengthwise of the work without influencing the tool-slide while the tool is making a straight line cut, but that when block 10 is held against movement on the way 9, the radius bar 12 will swing on stud 11 as a center and feed the tool-slide inwardly or outwardly on the carriage crossways 5, while it is also moving longitudinally with the carriage, thus causing the tool to describe the curved path of cutting travel coincident with the surface contour of the conical portion of the work, and the tool cut to or from the work, depending upon whether the radius bar is initially set at right angles to the bed or at an angle thereto.

A rod 14 extending parallel with the lathe bed has one end fixed to the slide pivot block 10, and its other end passes loosely through a guide bearing support 15, adjustably secured on the back rail 50 at the tail-stock end of the bed. On the upper portion of the support 15 is a sleeve 16 through which the rear end of rod 14 axially extends, the sleeve being formed with open ends. To one end is bolted the stop plug 18 centrally bored to form a slide bearing and guide for the rod 14 and to the opposite end is bolted a finish plate 17 centrally bored to the same diameter as the open sleeve end. This stop plug and finish plate are interchangeable to meet the various requirements of the device, as will later be described. Within sleeve 16 and on rod 14 is adjustably secured a stop collar 19 adapted to pass freely through the unplugged end of the sleeve as the rod 14 moves with block 10, but which is brought into endwise stop engagement with the inner surface of plug 18, when the rod 14 is moved a predetermined distance in the appropriate direction of travel, so holding the slide pivot block 10 stationary and causing the tool to describe a curved path of travel determined by the relative movements of the tool-slide and carriage in transverse planes.

The stop plug and collar function to automatically translate a straight line cut into a final curved line cut or vice versa and in either direction of carriage travel, (as diagramed in Figs. 7, 8, 9 and 10), the plug stop being placed in the head-stock end of sleeve 16, (as shown in Figs. 9 and 10), when the conical end of the work points toward the head-stock and whether the cutting travel of the carriage is from the tail-stock or head-stock end, while, with the projectile pointing toward the tail-stock, and whether the carriage moves to or from the head-stock, the stop plug is placed in the tail-stock end of the sleeve, as shown in Figs. 7 and 8.

This mechanism acts automatically as predetermined by the appropriate setting of the collar 19 and plug 18 and in a continuous carriage feed operation. In order to provide for starting in with the curved line cut and finishing with the straight line cut and in either direction of travel, as diagramed in Figs. 8 and 10, we provide the following devices:—

A rod has its forward end secured to the rear of the carriage and it extends parallel to the bed, its rear end sliding in bearings 40 of the support—below the sleeve. A rocking stud shaft 21 has a bearing in the wall 22 of the support (see Fig. 5), its inner end extending between rods 14 and 20, and having a rocking or trip arm 23 fixed thereto, the outer ends of which are to be tilted or tripped by a screw stud 24, interchangeable relative to the screw orifices 25, 26, in rod 20, the interchange to be made appropriate to the direction of travel of the carriage. The normal position of the arm 23 is in one or the other of the alternate tilted positions, shown in Figs. 7 and 8 or 9 and 10, to provide for which the horizontal ledge 27 of the support outside of the sleeve is formed with the two vertically extending screw bores 28, 29, for interchangeably holding a spring plunger 30, which yieldingly tilts one or the other ends of the arm 31, secured to the outer end of rock shaft 21. Thus the rod 20 always moves with the carriage, while rod 14 moves only when the tool is making a straight cut. If there is to be first, the straight and then the curved cut with the carriage moving toward the tail-stock, see Fig. 7, the stop plug 18 is placed in the tail-stock end of the sleeve and the trip stud 24 is properly set, as shown, the plunger 30 is placed in the rear orifice 29, thus raising the rear and depressing the forward end of arm 23. The rods 14 and 20 move in unison with the carriage and slide-block 10 toward the tail-stock, until the stop collar 19 strikes the cap 18, which will hold rod 14 and so hold the block 10 against motion, swinging the radius bar 12 to translate the tool-slide to make a curved cut, and in this motion the stop collar 19 is permitted to pass over the trip arm 23, the rear end of which is depressed and its forward end is yieldingly raised. The point of contact of the collar and plug will determine the point on the work when the tool will move from its straight to its terminal curved line of cutting.

In Fig. 8, when the carriage moves toward the head-stock and the cut starts on the curved and ends on the straight line, the rear end of arm 23 is raised and engaged by the collar 19, holding the slide-block and rod 14 stationary, while rod 20 moves with the carriage. The tool will start the curved cut, which continues until the trip 24 in orifice 26 of rod 20 moves under and past the pivot point of arm 23, raising the depressed forward end and tilting down the rear end of said arm from its stop engagement with collar 19, so that as the radius-bar 12 is brought to right angles to the lathe bed, the rod 14 will be free to move with the carriage, the stop collar passing over the arm 23 after it is brought into horizontal plane, (as shown in Fig. 6), and the tool will finish with the prescribed straight line cut.

To start with the straight line and to finish with the curved line cut, with the carriage moving toward the head-stock, (see Fig. 9), the stop plug 18 is placed in the forward end of the sleeve and the trip stud 24 is moved from the front to the rear orifice 25 on the rod 20. The slide-block 10 and the rods 14, 20, move in unison, the collar 19 passes through the rear open end of the sleeve, until it strikes the plug 18, holding rod 14 and block 10 stationary for the finishing curved cut.

To start with the curved cut and finish with the straight, with the carriage moving toward the tail-stock, (Fig. 10), the front end of arm 23 is tilted up into initial stop engagement with the collar 19 placed in the rear end of the sleeve, holding the rod 14 and block 10 stationary to commence with the curved cut. The trip stud 24 is placed in the rear orifice 25 of rod 20, and so will move under the raised forward end of arm 23, raising the rear depressed end, enabling rod 14 and block 10 to move with the carriage when the radius bar is at right angles to the bed, so as to finish with the straight cut.

It will be seen that the upper portions of bearings 40 for rod 20 are cut out so that the trip stud 24 can move into the support for tripping arm 23, and that collar 19 can move through the open end of sleeve 16, and that collar 19 can move from one end of the sleeve to the other when the arm 23 is tripped by stud 24 into horizontal or non-stop position within the sleeve.

In Fig. 7, the rearward positioned plug 18 and forward positioned collar 19 constitute the stop for holding rod 14 and block 10 against motion, for producing the curvature, in Fig. 8, the collar 19 and the rear raised end of trip 23, in Fig. 9, the forward positioned plug 18 and rearward positioned collar 19, and in Fig. 10, the collar 19 and forward raised end of trip 23, respectively constitute the stops. In Figs. 7 and 9 the collar neutralizes the trip 23 for the collar and plug stop, and in Figs. 8 and 10 the lug 24 of rod 20 trips the arm 23, to disengage the collar 19 and trip 23 interlock.

Having described our invention, we claim:

1. In a device of the class described, a bed, a carriage translating on said bed, a tool holding slide movable transversely on said carriage, a pivot block slidably mounted on said carriage, movable therewith, and connecting with said tool slide, and a stop holding said pivot block at a selected point while the carriage travels for moving said tool slide transversely on said carriage.

2. In a lathe of the character indicated, the combination of a carriage, a pivot plate slidably mounted upon the carriage in its line of travel and normally movable therewith, and a stop adapted to arrest the movement of the slide plate at a given point while permitting the carriage to continue its travel.

3. In a device of the class described, a bed, a longitudinally moving carriage, a tool-slide movable transversely on the carriage, a pivot block slidably supported on the carriage, a radius bar pivotally connecting the tool-slide and block, automatic means to render said block movable and immovable sequentially or vice versa, with and in either direction of carriage travel enabling a continuous tool cut in straight or curved lines, and mechanism for movably setting said means to determine the desired sequence of cut and the point of translation.

4. In a device of the class described, a bed, a longitudinally moving carriage, a tool-slide movable transversely on the carriage, a pivot block slidably supported on the carriage, a radius bar pivotally connecting the tool-slide and block and automatic means rendering said block immovable at the beginning of a cutting operation and movable with the carriage at a predetermined point.

5. In a device of the class described, a bed, a longitudinally moving carriage, a tool-slide movable transversely on the carriage, a pivot block slidably supported on the carriage, a radius bar pivotally connecting the tool-slide and block, and automatic means rendering said block movable with the carriage at the beginning of a cutting operation, and movable at a predetermined point in the carriage travel.

6. In a device of the class described, a bed, a longitudinally moving carriage, a tool-slide movable transversely on the carriage, a pivot block slidably supported on the carriage, a radius bar pivotally connecting the tool-slide and block, a member secured to the block and movable with the block and carriage, and a stop mechanism for said member adapted to be set for automatic operation to render said member and block immovable at a predetermined point in the carriage travel.

7. In a device of the class described, a bed, a longitudinally moving carriage, a tool-slide movable transversely on the carriage, a pivot block slidably supported on the carriage, a radius bar pivotally connecting the tool-slide and block, a member secured to the block and movable with the block and carriage, a stop mechanism for said member adapted to be set for automatic operation to render said member and block immovable at a predetermined point in the carriage travel, and a second member movable with the carriage adapted to release said stop mechanism at a predetermined point rendering the first member and block movable with the carriage.

8. In a device of the class described, a bed, a longitudinally moving carriage, a tool-slide movable transversely on the carriage, a pivot block slidably supported on the carriage, a radius bar pivotally connecting the tool-slide and block, a member movable with the block, a member movable with the carriage, and stop and release mechanism for said members adapted to operate automatically to render said block movable or immovable at a predetermined point in the carriage travel.

9. In a device of the class described, a bed, a longitudinally moving carriage, a tool-slide movable transversely on the carriage, a pivot block slidably supported on the carriage, a radius bar pivotally connecting the tool-slide and block, a rod secured to the block and extending lengthwise of the bed, a support for the rod, a rod secured to the carriage and moving on said support, an adjustable stop member on said support, a stop member on said block rod, and lock release members on said support and carriage rod, said stop and release members operating automatically at a predetermined portion of the carriage travel to change the direction of cut in a continuous carriage movement.

10. In a device of the class described, a bed, a longitudinally moving carriage, a tool-slide movable transversely on the carriage, a pivot block slidably supported on the carriage, a radius bar pivotally connecting the tool-slide and block, rods secured to the block and carriage respectively, a support for said rods, an adjustable stop on the support, a stop member on the block rod, a trip member on the support for interlocking with the block rod stop, and a member on the carriage rod adapted to actuate said trip to release the lock, said lock and tripping mechanism operating automatically at a predetermined point in the carriage travel to change the direction of cut during a continuous carriage movement.

11. In a device of the class described, a bed, a longitudinally moving carriage, a transversely moving tool slide on the carriage, contouring means for moving said slide on the carriage as the carriage moves on the bed, devices for rendering said contouring means inoperative, and automatic mechanism actuated at a predetermined point in the carriage travel to alternatively function said contouring means or said devices during a continuous carriage movement.

12. In a device of the class described, a bed, a longitudinally moving carriage, a transversely moving tool-slide on the carriage, contouring means for coördinately moving the tool-slide and carriage for curved line cutting, devices for rendering said contouring means inoperative for straight cutting, and mechanism to be initially set for a straight or curved cut at the beginning of the carriage travel and automatically operative at a predetermined point in the carriage travel to finish with a different line of cut during a continuous carriage movement.

13. In a device of the class described, a bed, carriage, and cross tool-slide, a member movable with the carriage and adapted to be held stationary when the carriage moves, means connecting said member and tool-slide to move the member in unison with the carriage and adapted to move the tool-slide on the carriage when held stationary, and stop mechanism for said member operative at a predetermined point in the carriage travel.

14. In a device of the class described, a bed, carriage, and cross tool-slide, a member movable with the carriage and adapted to be held stationary when the carriage moves, means connecting said member and tool-slide to move the member in unison with the carriage and adapted to move the tool-slide on the carriage when held stationary, stop mechanism for said member operative at a predetermined point in the carriage travel, and stop release mechanism operating automatically at a predetermined point in the carriage movement, whereby the tool cuts predetermined regular and irregular work during a continuous carriage movement.

15. A bed-lathe of the character indicated, embodying, in combination with the main slide-rest and its tool-rest movable transversely thereon, a pivot slide-plate movable upon the carriage in the latter's line of movement; a link having fixed pivotal connection with the tool-rest and the pivot slide-plate; means for retaining the pivot slide-plate normally in fixed relations with the carriage so as to move together as one; and means for arresting the movement of the pivot slide-plate at a given point and holding the same stationary while the carriage continues on without interruption beyond said point.

16. A bed-lathe of the character indicated, embodying in combination with the carriage and its tool-rest movable transversely thereon, a pivot slide-plate movable upon the carriage in the latter's line of movement; a link having fixed pivotal connections with the tool-rest and with the pivot slide-plate; means for retaining the pivot slide-plate normally connected in fixed relations of unitary movement with the carriage; means for arresting the movement of the pivot slide-plate at a given point and holding same stationary while the carriage continues on without interruption beyond said point; and means for reëstablishing the normal relations of unitary motion upon return of the carriage to the point of arrest and during its opposite travel beyond same.

17. In a lathe of the character indicated, a carriage provided with a movable tool-rest, a pivot-plate slidably mounted upon the carriage in the latter's line of travel and normally movable therewith and provided with a fixed pivot stud; and a link or "radius bar" pivotally carried at one end upon said fixed stud and pivotally connected at the other with the tool-rest and an adjustable stop arranged to arrest the movement of the slide plate at a desired point independently of the carriage movement.

In witness whereof we hereunto subscribe our names, as attested by the two subscribing witnesses.

FRANCIS B. COCKBURN.
JACK C. CARLTON.

Witnesses:
MILDRED SMITH,
L. BECK.

Copies of this patent may be obtained for five cents each, by addressing the "Commissioner of Patents, Washington, D. C."